United States Patent

[11] 3,625,348

| [72] | Inventors | Oliver R. Titchenal |
| | | Berea, Ohio; |
| | | Almar T. Widiger, Midland, Mich. |
| [21] | Appl. No. | 848,441 |
| [22] | Filed | Aug. 8, 1969 |
| [45] | Patented | Dec. 7, 1971 |
| [73] | Assignee | The Dow Chemical Company |
| | | Midland, Mich. |

[54] PACKAGING ARTICLES IN CONTAINERS HAVING SELF-ADHERING INNER LAYERS
27 Claims, 6 Drawing Figs.

[52] U.S. Cl. .................................................. 206/46 F,
53/30, 99/171 LP, 229/3.5 R, 229/87 F
[51] Int. Cl. ....................................................... B65b 31/00,
B65b 53/00, B65d 85/00
[50] Field of Search ........................................... 206/46 F,
46 M, DIG. 34; 99/171 R, 171 LP; 229/3.5 R, DIG. 12, DIG. 14, 87 F; 53/30, 22

[56] References Cited
UNITED STATES PATENTS

| 2,593,328 | 4/1952 | Meaker | 229/DIG. 14 |
| 2,664,358 | 12/1953 | Eichler | 229/DIG. 12 |
| 2,679,969 | 6/1954 | Richter | 229/3.5 |
| 2,919,059 | 12/1959 | Sporka | 229/3.5 |
| 2,956,671 | 10/1960 | Cornwell | 229/3.5 |
| 3,017,302 | 1/1962 | Hultkrans | 229/3.5 |
| 3,137,580 | 6/1964 | Sloan et al. | 206/46 |

*Primary Examiner*—William T. Dixson, Jr.
*Attorneys*—Griswold and Burdick, R. G. Waterman, L. J. Dankert and M. S. Jenkins ABSTRACT: An article is packaged in a multilayer flexible plastic sheet having a layer of a self-adhering plastic material and a layer of normally solid, thermoplastic organic polymer by (1) inserting the article between two opposing portions of the multilayer plastic sheet such that the layer of self-adhering plastic material faces the article; (2) collapsing the opposing portions into conforming contact with the article such that essentially all gases are permitted to pass out of the resulting package; and (3) sealing together the opposing contacting surfaces of said opposing portions to form a hermetically sealed package such that the self-adhering plastic material remains in clinging, conforming contact with the article and itself upon puncture of the multilayer plastic sheet.

PATENTED DEC 7 1971
3,625,348
SHEET 1 OF 2
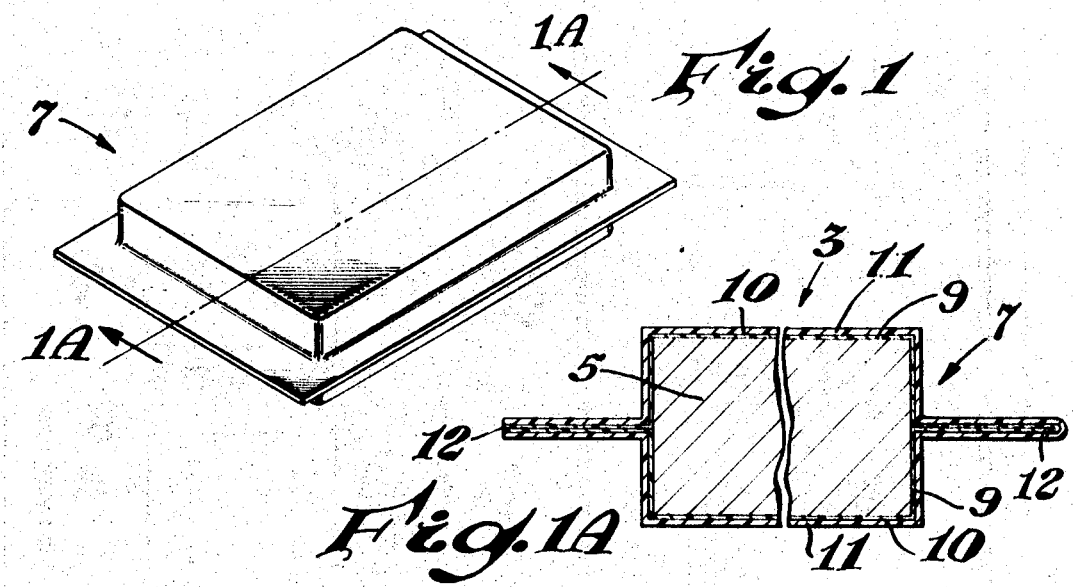
Fig. 1
Fig. 1A
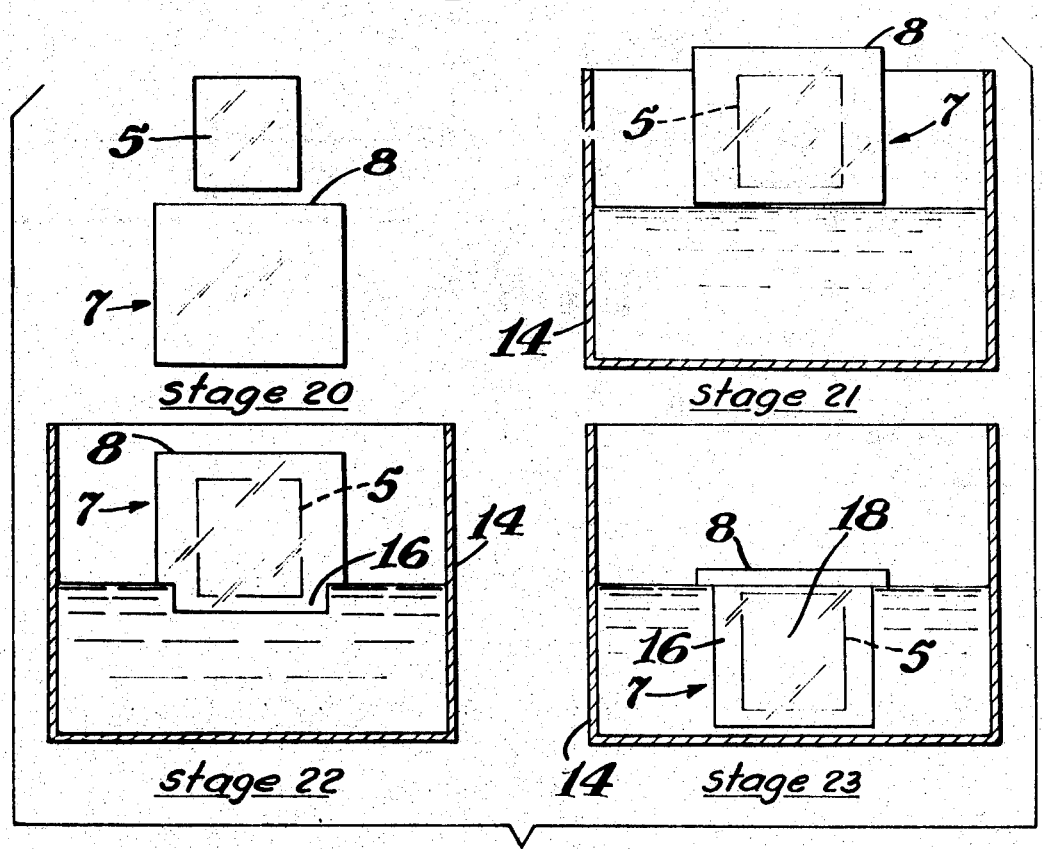
Fig. 2
INVENTORS.
Almar T. Widiger
Oliver R. Titchenal
BY Griswold & Burdick
ATTORNEYS INVENTORS.
Almar T. Widiger
Oliver R. Titchenal
BY Griswold E. Burdick
ATTORNEYS

PACKAGING ARTICLES IN CONTAINERS HAVING SELF-ADHERING INNER LAYERS

BACKGROUND OF THE INVENTION

This invention relates to methods for packaging articles with flexible plastic material and packaged articles provided thereby.

It is a common practice to package articles such as various foodstuffs, clothing and the like in flexible plastic bags or containers which are impervious to the passage of air or other gases and liquids or moistures.

In one common technique, such articles are packaged by the manual insertion of the product to be packaged into a bag or other container, followed by placing the unclosed package in vacuumizing and heat sealing machines. The heat sealed portion comprises only a small part of the total package; consequently, when the package is punctured elsewhere, leakage causes the package to inflate or otherwise separate from the article. The leakage of air into the package either spoils the article or otherwise causes loss of appearance. In another common technique similar to the above, the unclosed package containing the article is vacuumized and subsequently clipped to prevent leakage of the air back through the opening. Packages prepared by this technique suffer from similar faults to those discussed above and also require somewhat expensive clamps which oftentimes puncture the package.

Since it is virtually impossible to provide a punctureproof package, it would be highly desirable to provide a hermetically sealed package of an essentially transparent flexible plastic film which remains in conforming contact with the article and itself upon puncture of the package.

SUMMARY OF THE INVENTION

In accordance with the present invention a package having the above characteristics is provided by a method generally comprising the steps of (1) inserting an article between two opposing plastic sheet portions, said sheet portions being flexible, multilayer plastic sheet having a first layer of a self-adhering plastic material facing the article and a second layer being formed of a normally solid, plastic material different from the first layer and providing structural strength for the resultant multilayer plastic sheet; (2) collapsing the opposing sheet portions into conforming contact with the article such that essentially all gases are permitted to pass out of the resulting package; and (3) sealing together the opposing, contacting surfaces of said sheet portions to form a hermetically sealed package which remains in clinging conforming contact with said article upon puncture of the multilayer plastic sheet. In the practice of step (1) of the method of this invention, it is understood that the opposing plastic sheet portions may actually be in the form of two separate sheets, or in the form of a bag wherein the opposing portions are adhered together at 3 of 4 edges, or in the form of another similar container wherein the opposing sheet portions are superimposed on one another and sealed together around at least a portion of their periphery, said container being provided with an opening.

As a result of the self-adherence of the layers of the sheet portions facing the article, a continuous seal is formed at most points of contact between the layers. In addition, portions of said self-adhering layers in contact with the article usually and beneficially have sufficient adhesion to cling to the article. As a consequence of the continuous seal between the opposing contacting layers and the ability of these layers to cling to the packaged article, exposure of the article to air or other gaseous material upon puncture of the package is localized, thereby minimizing any spoilage or loss of appeal due to such puncture.

In a particularly preferred embodiment of this invention is provided a novel packaged article comprising an article enclosed in flexible multilayer plastic sheet having a lining layer of a self-adhering plastic material which is in clinging conforming contact with the article and, outside of the lining layer, a shrunk layer of a heat-shrinkable, normally solid, plastic material different from the lining layer and providing structural strength for the resultant multilayer sheet. The surfaces of the multilayer plastic sheet are sealed together at essentially all points of contact of lining layer to lining layer such that the multilayer sheet remains in clinging conforming contact with said article upon puncture of said multilayer sheet. Accordingly, the above novel packaged article is provided by a preferred embodiment of the aforementioned general method of the invention, the preferred method comprising the steps of (1) inserting an article into a container of flexible, multilayer plastic sheet having a lining layer of a self-adhering plastic material and an outer layer of a heat-shrinkable normally solid, plastic material different from the lining layer and providing structural strength for the resultant multilayer sheet and (2) gradually shrinking the container into clinging conforming contact with the article such that essentially all gases are permitted to pass out of the resulting package while simultaneously and progressively sealing together the opposing, contacting surfaces of the lining layer until essentially all such surfaces are sealed together.

A method of the present invention can be employed in packaging articles such as foodstuffs, clothes, metal articles and the like. This novel method is particularly useful in the packaging of perishable foodstuffs such as dairy products, meats, fresh fruits and vegetables and the like.

BRIEF DESCRIPTION OF THE DRAWING

In the drawings, various forms of the invention are shown, but it is to be understood that it is not limited to such forms since the invention as set forth in the claims may be embodied in a variety of forms. In the Drawings:

FIG. 1 is a perspective view showing a packaged article of the invention.

FIG. 1A is a fragmentary cross-sectional view of the packaged article of FIG. 1.

FIG. 2 depicts, by way of a left-to-right series of pictorial diagrams, sequential stages of a preferred embodiment of the method of the invention.

Similar reference characters refer to similar parts throughout the several drawings.

DESCRIPTION OF THE PREFERRED EMBODIMENTS

Figure 3:
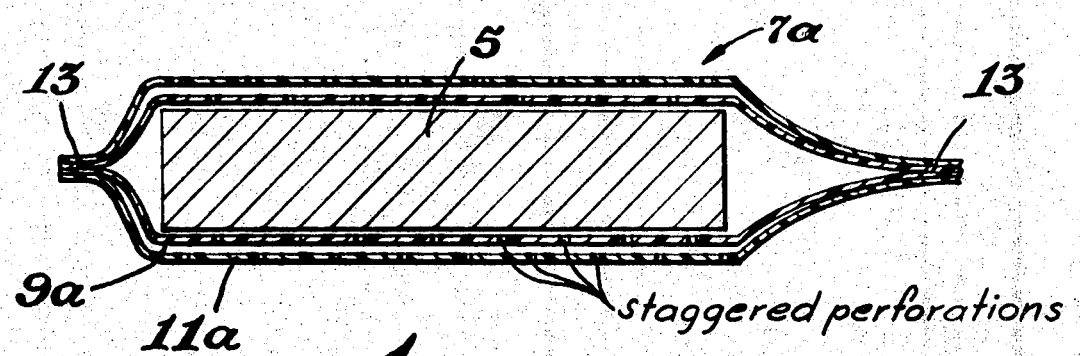
FIG. 3 is a fragmentary cross-sectional view of a particular embodiment of the invention wherein a duplex bag is employed as the two plastic sheet portions.

With reference to FIGS. 1 and 1A, there is illustrated the packaged article 3 of the invention having an article 5 enclosed in a flexible multilayer container 7 having a lining layer 9 of a self-adhering plastic material and bonded to surface 10 of the lining layer, a shrunk layer 11 of a heat-shrinkable, normally solid thermoplastic organic polymer. The lining layer 9 is in clinging conforming contact with essentially the entire surface of the article. The opposing, contacting portions of the lining layer 9 are sealed together along the interface 12. The seal strength of the contacting opposing layers and the ability of the self-adhering plastic lining layer 9 to cling or slightly bond to article 5 enables the flexible multilayer container to remain in clinging conforming contact with the article 5. The ability of the container to remain in conforming contact with article 5 is further enhanced by the inward force exerted by the shrunk layer 11 resulting from heat-shrinking layer 11.

FIG. 2 illustrates, by way of a left-to-right series of pictorial diagrams, the sequential stages of a preferred embodiment of the method of the invention. Stage 20 shows the insertion of the article 5 into a flexible multilayer container 7 as shown in FIGS. 1 and 1A. Stage 21 shows the article 5 partially enclosed in the container 7 which is about to be lowered into a vessel 14 of water heated to a temperature at or above the heat shrink temperature of the heat shrinkable polymer which forms the outer layer of container 7. Stage 22 shows the article 5 partially enclosed in container 7 being gradually lowered into the water in vessel 14 such that the portion 16 of the container 7 which is immersed in the water shrinks into clinging conforming contact with the article 5. As the container 7 and article 5 are gradually lowered further into the vessel 14 of water, air or other entrapped gases are permitted to escape from the open portion 8 in the container 7. Stage 23 shows the article enclosed in the container 7 being completely immersed in the water with only the open portion 8 remaining above the surface. At this stage of the method, the portion 18 of container 7 immediately surrounding article 5 is in clinging conforming contact with article 5 and the opposing contacting portion 16 forms a seal which completely surrounds article 5. The unsealed open portion 8 may be sealed by lowering the container 7 further into the water or the container may be withdrawn from the vessel of water immediately with the unsealed open portion remaining as a means to facilitate subsequent reopening of the package.

The flexible opposing plastic sheet portions used in the present invention are of flexible, essentially transparent, multilayer plastic sheet having a first layer of a self-adhering plastic material and a second layer of a normally solid plastic material different from the first layer and providing structural strength to the resultant multilayer sheet. The layers of the multilayer plastic sheet are adhered together along substantially coextensive contiguous surfaces thereof. It is understood that while only a self-adhering layer and a layer of normally solid plastic material are required, other layers of the same or different plastic materials may also be employed. The multilayer plastic sheet has a thickness ranging from about 0.2 to about 15 mil, preferably from about 0.5 to about 5 mil. The first layer of self-adhering plastic material has a thickness ranging from about 0.05 to about 3 mil, preferably from about 0.2 to about 0.8 mil; and the second layer of thermoplastic organic polymer has a thickness ranging from about 0.5 to about 15 mil, preferably from about 1.0 to about 5.0 mil.

Suitable examples of the normally solid, plastic materials which are different from the self-adhering material and which provide satisfactory structural strength to the multilayer sheet are nontacky, normally solid, thermoplastic organic polymers including the nontacky, normally solid polymers of the following monomers: the monoolefins and conjugated diolefins, e.g., ethylene, propylene, butene-1, isobutene, 1,3-butadiene, isoprene and other aliphatic mono- and diolefins; the halogens substituted olefins, e.g., vinyl chloride, vinylidene chloride, and the like; the monovinylidene aromatic compounds, e.g., styrene, $\alpha$-methylstyrene, ar-methylstyrene, chlorostyrene, and other aromatic olefins; and other ethylenically unsaturated monomers such as acrylonitrile, acrylamide and the like. Also included among the suitable polymers are the polyamides such as nylon, chlorinated polyolefins such as chlorinated polyethylene, cellulosic plastics such as cellophane, ethyl cellulose, methyl cellulose and the like.

For the purposes of this invention, a nontacky polymer is one having a cohesive strength (self-adhesion) less than about 0.5 pound/inch of width. For the purposes of this invention, cohesive strength of the nontacky polymer providing structural strength is the strength of the bond formed between two opposing, contacting layers of the nontacky polymer when said layers are subjected to low pressure, e.g. less than 20 pounds per square inch (p.s.i.), and temperatures below the heat distortion point of the nontacky polymer. A normally solid polymer is one which exists as a solid at ambient temperatures.

Of particular interest in the practice of this invention are the heat shrinkable layers or films of barrier polymers such as vinylidene chloride copolymers, copolymers of vinylidene chloride with vinyl chloride and other ethylenically unsaturated monomers, and the like. Vinylidene chloride/vinyl chloride copolymer, better known as "Saran," is preferred because of high tensile strength, good barrier against moisture and vapor transmission, good clarity, and good conformability to the item being packaged. Most desirable copolymers of this type have from about 70 to about 90 weight percent of polymerized vinylidene chloride and from about 10 to about 30 weight percent of polymerized vinyl chloride. Such polymers are converted to heat shrinkable layers or films by one of several common techniques such as extrusion of the polymer from an annular die in the form of a tube followed by blowing the tube into an enlarged bubble at temperatures near the heat distortion point of the polymer.

Self-adhering plastic materials suitably employed in the practice of this invention are normally solid organic polymers which can be bonded to the structural layer of the normally solid, thermoplastic organic polymer, the resulting bond having peel strengths as determined according to ASTM D903 ranging from about 1 to about 16 pounds/inch of width, preferably from about 3 to about 5 pounds/inch of width. In addition, said self-adhering materials have cohesive strengths ranging from about 1 to about 16 pounds/inch of width, preferably from about 3 to about 5 pounds/inch of width. For the purposes of this invention, cohesive strength of a self-adhering plastic material is the strength of the bond formed between two opposing, contacting layers of said self-adhering material when said layers are subjected to low pressure and temperatures below the heat distortion point of the nontacky polymer of the structural layer. When the multilayer plastic sheet comprises a layer of ethylene/vinyl acetate copolymer and a layer of vinylidene chloride/vinyl chloride copolymer, such temperatures range from about 70° to about 130° C., preferably from about 80° to about 100° C.; and preferred pressures range from about 5 to about 50 pounds per square inch (p.s.i.), especially from about 10 to about 20 p.s.i. Such self-adhering plastic materials generally seal over a broad range of temperature, preferably the temperature range is greater than 16° C. Particularly effective adhesive plastic materials include unsaturated ester polymers such as ethylene/unsaturated ester copolymers, e.g., ethylene/vinyl acetate, ethylene/vinyl propionate, ethylene/methyl methacrylate, ethylene/ethyl methacrylate, ethylene/ethyl acrylate, ethylene/isobutyl acrylate, and the like; unsaturated carboxylic acid polymers, e.g., ethylene/unsaturated carboxylic acid copolymers, e.g., ethylene/acrylic acid, ethylene/methacrylic acid, ethylene/maleic acid, ethylene/fumaric acid, ethylene/itaconic acid, and the like; low molecular weight polyethylene, low molecular weight polypropylene and low molecular weight polyolefins. Other suitable adhesives which include normally solid pressure-sensitive or heat-sensitive plastic adhesives commonly applied by one skilled in the packaging arts. Examples of such adhesives generally described in Modern Packaging Encyclopedia, Vol. 41, No. 7A, 141(1968) under the classification, "Resin Adhesives." Preferred self-adhering plastic materials are unsaturated ester polymers containing at least 5 weight percent of polymerized unsaturated ester, especially such polymer containing from about 15 to about 40 weight percent of polymerized unsaturated ester. Of the unsaturated esters vinyl acetate, ethyl acrylate and isobutyl acrylate are preferred. An especially preferred unsaturated ester polymer is an ethylene/vinyl acetate copolymer having from about 15 to about 40 weight percent of vinyl acetate. Also preferred are the olefin/unsaturated carboxylic acid copolymers containing from about 3 to about 30 weight percent of $\alpha,\beta$-ethylenically unsaturated acid, for example, ethylene/acrylic acid copolymers having from about 3 to about 12 weight percent of acrylic acid. Preferred self-adhering plastic materials have melt flow viscosities as determined by ASTM D–1238 –65T(E) ranging from about 2 to about 100 decigrams/minute, especially those having melt flow viscosities between 5 and 20 decigrams/minute. Methods or techniques for preparing the above self-adhering plastic materials are well known to those skilled in the art.

The flexible, multilayer plastic sheet is advantageously prepared by coextruding the thermoplastic organic polymer as one layer with the self-adhering plastic material as the second layer. Additional layers may also be coextruded along with the above mentioned polymer layers to effect a variation in the desired characteristics in the film, provided that the self-adhering plastic material forms a surface layer of the plastic sheet portion. In accordance with coextrusion techniques the respective polymer compositions are fed into separate polymer feeding devices of a coextrusion apparatus for preparing sheet film and coating, for example, as described in Belgium Pat. No. 683,208. Preferably the multilayer film in the form of a tube is chilled immediately after extrusion at 5° to 25° C. and then tempered at 20° to 50° C. via a cooling and heating bath respectively for subsequent blowing of the tube to effect orientation of the plastic molecules. In accordance with another suitable techniques, each polymer composition can be extruded as a separate layer and subsequently laminated to provide the multilayered plastic sheet portion.

In carrying out the process of the present invention, the article to be packaged is first inserted between the two opposing sheet portions, each having a layer of the self-adhering plastic material facing the article. The sheet portions are then collapsed into conforming contact with the article in a gradual manner such that essentially all gases are permitted to pass out of the resulting package. Finally and often simultaneously, with the previous operation, the sheet portions are progressively sealed together such that the opposing contacting surfaces of said sheet portions form a hermetically sealed package which remains in clinging, conforming contact with said article upon puncture of a sheet portion.

In preferred embodiments the sheet portions are in the form of a container, such as a bag wherein the sheet portions are superimposed on one another and sealed together around at least a portion of their periphery, a portion of said container being provided with an opening. Said sheet portions of the container are laminates having a layer of the self-adhering plastic material which forms a liner for the container and a layer of a normally solid, thermoplastic organic polymer. In such embodiments, it is preferred that the thermoplastic organic polymer layer be a heat shrinkable polymer film. By the term "heat shrinkable polymer film," is meant a film which will exhibit a 20 percent shrinkage or greater upon exposure to temperature from about 80° to about 150° C., preferably from about 40 to about 60 percent shrinkage at these temperatures.

In another embodiment, the container is a so-called "multiplex bag" which has essentially a bag within a bag construction or a multiple wall construction. The individual bags of the "multiplex bag" may be completely separate, attached at their edges or along their openings, or the like. In the case of the multiplex bag having a multiple wall construction, the walls are generally sealed together about their edges. As a further modification, each of the individual bags or walls of the multiplex bag can be perforated such that the perforations are out of registration or are in staggered configuration with the perforations of the next adjacent bags or walls. In another modification only the lining bag or walls are perforated. A particularly effective "multiplex bag" is exemplified by the "duplex bag" depicted in FIG. 3. With reference to FIG. 3 there is illustrated an article 5 enclosed in a flexible "duplex bag" 7a. The lining walls 9a comprise a layer of the self-adhering plastic material and the outer walls 11a comprise a layer of the normally solid, nontacky, thermoplastic organic polymer. The lining walls 9a and outer walls 11a are perforated such that the perforations of each lining wall 9a are staggered with respect to the perforations of each next adjacent outer wall 10a, designated "staggered perforations" in FIG. 3. The open ends of the "duplex bag" 7a are sealed together at interfaces 13, preferably by an impulse sealing technique. A vacuum can be drawn to remove air from the "duplex bag" 7a through the staggered perforations and upon release of the vacuum the "duplex bag" 7a collapses into clinging, conforming contact with article 5. As a result of collapsing the "duplex bag" 7a about the article 5, the staggered perforations of the lining walls 9a are closed off from the outside thus preventing air from flowing back into the "duplex bag" 7a.

Other embodiments include various combinations or obvious variations of the above described containers.

In general the opposing sheet portions can be readily collapsed into conforming contact with the article by folding operations, vacuumizing a container, or other similar packaging techniques. In some preferred embodiments, however, the opposing sheet portions in the form of a container are collapsed about the article by shrinking said sheet portions into conforming contact. It is desirable that such shrinking process be carried out gradually such that the gases are permitted to pass out of the container through an appropriate opening. In a particularly effective technique wherein the container is a heat-shrinkable, nonporous bag, the article encompassed by said bag is slowly lowered into a water bath heated to the shrink temperature of the polymer of the outer layer. The sheet portions near the opening of the container are last to pass into the heated bath, thereby letting gases which would otherwise be entrapped with the article to flow out of the passage and permitting conforming contact of the sheet portions with said articles. Accordingly, vacuumizing operations are avoided. It is further understood that another collapsing technique such as vacuumizing or other collapsing technique may be used in combination with the shrinking operation in order to bring sheet portions into conforming contact with the article.

To seal together all opposing contacting surfaces of said sheet portions, the sheet portions collapsed about the article are now heated to temperatures ranging from about 80° to about 100° C. The resulting seal between the self-adhering plastic material layers is sufficiently strong such that the force required to pull apart the sheet portions ranges from about 1 to about 16 pounds/inch of width, preferably from about 2 to about 5 pounds/inch of width. This seal compares favorably with the weak seals of many thermoplastic organic polymers such as the vinyl chloride and vinylidene chloride polymers and copolymers which must be heat sealed, if at all, at fairly high temperatures, usually between 115° to 140° C. In the case of the preferred embodiment depicted in FIG. 2 and described hereinbefore, the sealing occurs simultaneously with collapsing the sheet portions about the article by heat shrinking the sheet portions.

As a further optional modification regarding the sealing operation and following insertion of the article between two sheet portions, the opposing individual sheet portions or the opposing sheet portions of a container may be sealed in a discontinuous manner, so-called skip or maze sealing, such that air passages remain between the enclosed article and the outside.

Figure 4:
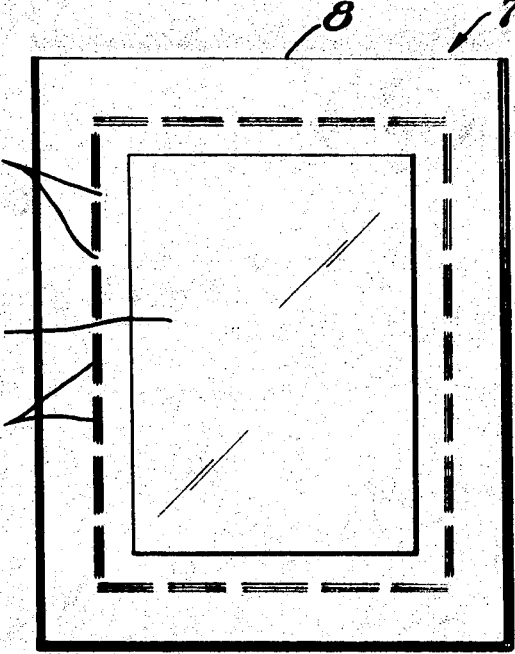
FIG. 4 is a perspective view showing another embodiment of the invention wherein a skip sealing technique is employed.

The use of skip sealing techniques is illustrated in FIG. 4 which shows an article 5 enclosed in a container 7 which is a bag having an open end 8 and a lining layer of the self-adhering plastic material and an outer layer of the normally solid, nontacky plastic material. Skip seals are provided about the article in the manner depicted in FIG. 4 by conventional sealing techniques, e.g., impact sealing with a sealer bar. The skip seals maintain the article in a set position within the container throughout the collapsing and sealing operations.

Figure 5:
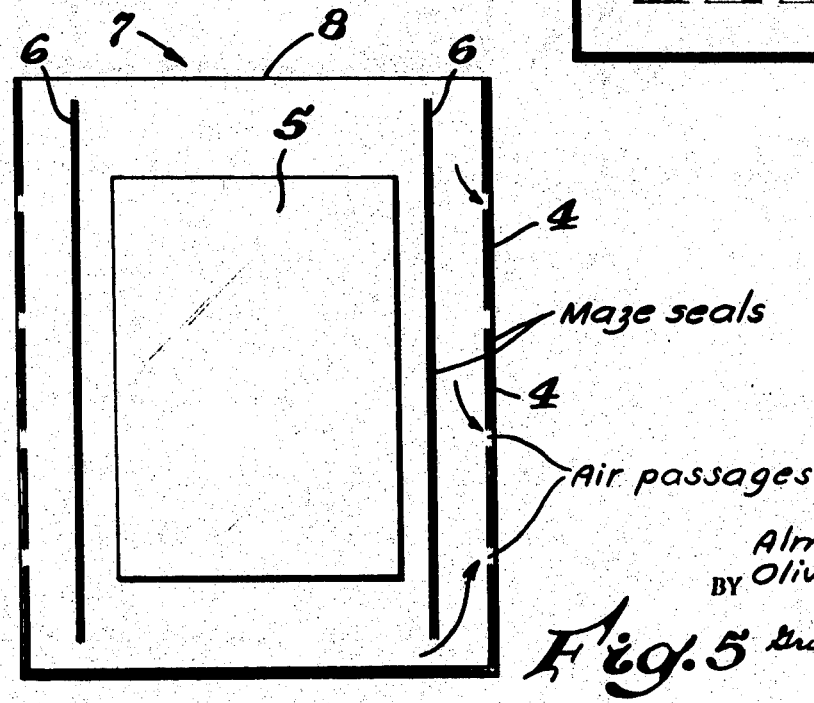
FIG. 5 is a perspective view showing an embodiment of the invention wherein a maze sealing technique is employed.

Maze sealing is exemplified in FIG. 5 which illustrates an article 5 enclosed in a container 7 which is a bag having an open end 8 and a lining layer of the self-adhering plastic material and an outer layer of the normally solid, nontacky plastic material. Maze seals are provided as depicted in FIG. 5 by known methods. By one technique several bags are made in a strip with main seals 6, which form a part of the maze, being provided next to the article 5 for the purposes of strength and to maintain the article in a fixed position within the bag. The shorter or minor seals 4 are provided when the bags of the strip are separated from each other by cutting between the main seals 6 with a hot knife. The open end 8 is advantageously sealed with a sealer bar after insertion of the article and just prior to the collapsing and sealing operations.

By employing either of the above techniques it is possible to fill and close the bag with conventional apparatus.

The enclosed article may be subsequently vacuumized to collapse the sheet portions into clinging, conforming contact with the article and to close the remaining air passages. The resulting package will retain its vacuum upon release of the vacuum, even before the sealing operation is carried out. However, the closing of the air passages or vents and the vacuum is further enchanced by heating the package until opposing contacting surfaces of the self-adhering plastic material are securely sealed together. In accordance with these modifications, the need for a sealer bar or similar mechanism in the vacuumizing chamber is eliminated. It is further understood that when the outer layer of the bag is heat-shrinkable polymer the collapsing operation can be effectively carried out by placing the maze or skip sealed package in a shrink tunnel or similar apparatus. Partial vacuum would be effected by the shrink energy of the heat-shrinkable polymer.

The sheet portions of the resulting package do not separate from themselves nor do they separate from the article upon puncture. In fact, the sheet portions actually cling to the article. As a result, any spoilage or loss of appearance which might result from exposing the article to air is localized.

The following examples are given to illustrate this invention and should not be construed as limiting its scope. In the specification and claims all parts and percentages are by weight unless otherwise indicated.

EXAMPLE 1

A 2-inch cube of cheese is inserted into a bag of a heat-shrinkable multilayer plastic film having a 0.4 mil layer of ethylene/vinyl acetate copolymer (72/28) (melt flow viscosity = 6 decig/min.) laminated to a 2 mil layer of vinylidene chloride/vinyl chloride copolymer (73/27) that is biaxially oriented. The bag containing the article is lowered into a boiling water bath at a rate of about 5 inches per sec. The bag shrinks into conforming contact with the article and all opposing contacting surfaces of the ethylene/vinyl acetate layer are sealed. Upon puncture of the bag the multilayer film remains in conforming contact with the article. A force of about 4 lbs. per inch of width is required to pull apart the contacting and opposing surfaces of the sheet portions.

EXAMPLE 2

In a manner similar to the procedure of example 1 a ring of bologna is inserted into a bag of an unoriented multilayer plastic film having a 0.50 mil lining layer of ethylene/vinyl acetate copolymer (72/28) (melt flow viscosity = 6 decig/min), a 0.25 mil layer of vinyl chloride/vinylidene chloride copolymer (15/85), a 0.25 mil layer of the ethylene/vinyl acetate copolymer and a 1 mil exterior layer of ethylene/propylene copolymer (4.5/95.5) (melt flow viscosity = 8 decig/min) laminated together in respective order. The bologna-in-bag is placed in a vacuumizing chamber which is evacuated to 10 mm. pressure thereby collapsing the film about the ring of bologna. The enclosed bologna is dipped into boiling water for 2 seconds thereby sealing opposing contacting surfaces of the lining layer and causing the lining layer to cling to the bologna. Upon puncture of the bag, the multilayer film remains in clinging conforming contact with the bologna. A force of greater than 3 pounds/inch of width is required to pull apart the opposing, contact surfaces of the lining layer portions.

EXAMPLE 3

A cube of cheese is packaged according to the procedure of example 1 with a bag of a heat-shrinkable multilayer plastic film having a 0.4 mil layer of polyvinyl acetate laminated to a 2 mil layer of vinylidene chloride/vinyl chloride copolymer (73/27). A force of greater than 1 pound/inch of width is required to pull apart the opposing, contacting sheet portions.

What is claimed is:

1. A method of packaging comprising the steps of (1) inserting an article between two opposing sheet portions, each of said sheets being flexible, multilayer plastic sheet having a first layer of a self-adhering plastic material facing the article and a second layer of a nontacky normally solid plastic material different from the first layer and providing structural strength to the multilayer plastic sheet, said self-adhering material capable of bonding to itself at temperatures below the heat distortion point of said nontacky normally solid plastic material; (2) collapsing the opposing sheet portions into clinging, conforming contact with the article such that essentially all gases are permitted to pass out of the resulting package; and (3) sealing together the opposing contacting surfaces of said sheet portions to form a hermetically sealed package which remains in clinging, conforming contact with said article upon puncture of said sheet portions.

2. A method according to claim 1 wherein the self-adhering plastic material is capable of bonding to itself at temperatures between about 80° and about 100° C. and step (3) is carried out by heating the resulting package to a temperature between about 80° and about 100° C.

3. A method according to claim 2 wherein the self-adhering plastic material is a polymer containing at least 5 weight percent of a polymerized unsaturated ester.

4. The method according to claim 3 wherein the unsaturated ester is vinyl acetate.

5. The method according to claim 4 wherein the unsaturated ester polymer is an ethylene/vinyl acetate copolymer.

6. The method according to claim 2 wherein the self-adhering plastic material is polyvinyl acetate.

7. The method according to claim 2 wherein step (3) is carried out by immersing the resulting package in boiling water.

8. The method according to claim 1 wherein the self-adhering plastic material is an olefin/unsaturated acid copolymer containing at least 3 weight percent of unsaturated acid.

9. The method according to claim 8 wherein the copolymer is an ethylene/acrylic acid copolymer.

10. The method according to claim 1 wherein the opposing sheet portions in the form of a container having an opening are collapsed into clinging, conforming contact with the article by evacuating all gases from the container.

11. A method of packaging comprising the steps of (1) inserting an article into a container having two sheet portions superimposed upon one another and sealed together around at least a portion of their periphery, said container being provided with an opening, said sheets being flexible, multilayer plastic sheet having a first layer of a self-adhering plastic material facing the article and a second layer of a normally solid, heat-shrinkable, plastic material different from the first layer and providing structural strength to the multilayer plastic sheet, said self-adhering material being capable of bonding to itself at temperature below the heat distortion temperature of the heat-shrinkable plastic material and (2) shrinking the container into conforming contact with the article such that essentially gases are permitted to pass out of said opening while simultaneously sealing together the opposing, contacting surfaces of said sheet portions to form a hermetically sealed package which remains in clinging, conforming contact with said article upon puncture of parts of said package.

12. The method according to claim 11 wherein the heat-shrinkable polymer is a vinylidene chloride/vinyl chloride copolymer.

13. A packaged article comprising an article enclosed in a flexible, multilayer plastic sheet having a layer of a self-adhering plastic material, said layer facing the article, and a shrunk layer of a heat-shrinkable, normally solid, plastic material different from the first layer and providing structural strength to the plastic sheet, said self-adhering plastic material being capable of bonding to itself at temperatures below the heat distortion point of the heat-shrinkable plastic material, said plastic sheet being in clinging, conforming contact with the article and all opposing contacting surfaces of the plastic sheet being sealed together such that the plastic sheet remains in clinging, conforming contact with said article upon puncture of said sheet.

14. A container comprising at least two opposing sheet portions of a flexible, multilayer plastic sheet having a lining layer of a self-adhering plastic material and a layer of a outside of the lining layer of a heat-shrinkable normally solid, plastic material different from the first layer and providing structural strength for the plastic sheet, said self-adhering plastic material being capable of bonding to itself at temperatures below the heat distortion point of the heat-shrinkable plastic material, the opposing sheet portions being superimposed on one another and sealed together around at least a portion of their periphery, said container being provided with an opening.

15. The container according to claim 14 wherein the self-adhering plastic material is an unsaturated ester polymer which is capable of bonding to itself at a temperature between about 80° and about 100° C.

16. The container according to claim 15 wherein the unsaturated ester polymer is an ethylene/vinyl acetate copolymer containing at least 5 weight percent of polymerized vinyl acetate.

17. The container according to claim 14 wherein the heat-shrinkable polymer is a heat-shrinkable vinylidene chloride/vinyl chloride copolymer.

18. A method of packaging according to claim 1 comprising the steps of (1) inserting an article between two opposing sheet portions, each of said sheets being flexible, multilayer plastic sheet having a first layer of a self-adhering plastic material facing the article and a second layer of nontacky, normally solid plastic material different from the first layer and providing structural strength to the multilayer plastic sheet; (2) sealing the sheet portions together in a discontinuous manner such that air passages remain; (3) collapsing the opposing sheet portions into clinging, conforming contact with the article such that essentially all gases are permitted to pass out of the resulting package; such that remaining air passages are closed; and (4) sealing together the opposing contacting surfaces of said sheet portions to form a hermetically sealed package with remains in clinging, conforming contact with said article upon puncture of said sheet portions.

19. A method of packaging according claim 1 comprising the steps of (1) inserting an article into a flexible multiplex bag having individual lining walls of a self-adhering plastic material and individual outer walls of a nontacky, normally solid plastic material different from the lining walls and providing structural strength to the multiplex bag; (2) collapsing the multiplex bag into clinging, conforming contact with the article such that essentially all gases are permitted to pass out of the resulting package; and (3) sealing together the opposing contacting surfaces of said lining walls to form a hermetically sealed package which remains in clinging, conforming contact said article upon puncture of said multiplex bag.

20. The method according to claim 19 wherein the individual walls of the multiplex bag are each perforated such that the perforations of one wall are out of registration with the perforations of the next adjacent walls.

21. The multiplex bag according to claim 19.

22. The multiplex bag according to claim 20.

23. The method of packaging according to claim 18 comprising the steps of (1) inserting an article between two opposing sheet portions, each of said sheets being a flexible multilayer plastic sheet having a first layer of a self-adhering plastic material capable of bonding to itself at temperatures between about 80° and 100° C. facing the article and a second layer of nontacky, normally solid plastic material different from the first layer and providing structural strength to the multilayer plastic sheet, said sheet portions being sealed together in a discontinuous manner such that mazelike air passages remain, (2) collapsing the opposing sheet portions into clinging, conforming contact with the article such that essentially all gases are permitted to pass out of the resulting package and the remaining mazelike air passages are closed and (3) sealing together the opposing contacting surfaces of said sheet portions to form a hermetically sealed package which remains in clinging, conforming contact with said article upon puncture of said sheet portions.

24. The method according to claim 23 wherein steps (2) and (3) are carried out in a single operation by heating the resulting package in a vacuumizing chamber to a temperature between about 80° and about 100° C.

25. A container comprising at least two opposing sheet portions of a flexible, multilayer plastic sheet having a lining layer of a self-adhering plastic material and a layer outside of the lining layer of a nontacky normally solid plastic material different from the first layer and providing structural strength to the multilayer plastic sheet, said self-adhering material being capable of bonding to itself at temperatures below the heat distortion point of the nontacky normally solid plastic material, the opposing sheet portions being superimposed on one another and sealed together in a discontinuous manner to form discontinuous seals such that air passages remain between the inside of said container and the outside.

26. The container according to claim 25 wherein the discontinuous seals are maze seals forming mazelike air passages therebetween.

27. The container according to claim 25 wherein the discontinuous seals are skip seals.

* * * * *

PO-1050
(5/69)

UNITED STATES PATENT OFFICE
CERTIFICATE OF CORRECTION

Patent No. 3,625,348     Dated  7 December 1971

Inventor(s)   Oliver R. Titchenal and Almar T. Widiger

It is certified that error appears in the above-identified patent and that said Letters Patent are hereby corrected as shown below:

In column 9, line 3, change "layer of a outside" to --layer outside--; in line 37 delete "with" and insert --which--.

In column 10, line 2, insert --with-- between "contact" and "said".

Signed and sealed this 13th day of June 1972.

(SEAL)
Attest:

EDWARD M. FLETCHER, JR.          ROBERT GOTTSCHALK
Attesting Officer                Commissioner of Patents